US 011858494B2

(12) United States Patent
Yu et al.

(10) Patent No.: US 11,858,494 B2
(45) Date of Patent: Jan. 2, 2024

(54) METHOD FOR PROCESSING VEHICLE DRIVING MODE SWITCHING, VEHICLE AND SERVER

(71) Applicant: APOLLO INTELLIGENT DRIVING TECHNOLOGY (BEIJING) CO., LTD., Beijing (CN)

(72) Inventors: Gao Yu, Beijing (CN); Jingjing Xue, Beijing (CN); Gaifan Li, Beijing (CN); Donghui Shen, Beijing (CN); Tong Wu, Beijing (CN); Jiaqi Liang, Beijing (CN)

(73) Assignee: APOLLO INTELLIGENT DRIVING TECHNOLOGY (BEIJING) CO., LTD. (CN)

( * ) Notice: Subject to any disclaimer, the term of this patent is extended or adjusted under 35 U.S.C. 154(b) by 451 days.

(21) Appl. No.: 17/124,537

(22) Filed: Dec. 17, 2020

(65) Prior Publication Data

US 2021/0101622 A1 Apr. 8, 2021

Related U.S. Application Data

(63) Continuation of application No. PCT/CN2019/126268, filed on Dec. 18, 2019.

(30) Foreign Application Priority Data

Jan. 15, 2019 (CN) .......................... 201910035550.X (51) Int. Cl.
*B60W 60/00* (2020.01)
*B60W 40/02* (2006.01)
(Continued)

(52) U.S. Cl.
CPC ........ *B60W 60/0053* (2020.02); *B60W 40/02* (2013.01); *B60W 50/082* (2013.01);
(Continued)

(58) Field of Classification Search
None
See application file for complete search history.

(56) References Cited

U.S. PATENT DOCUMENTS

2017/0203770 A1 7/2017 Kondo
2018/0105184 A1 4/2018 Urano et al.
(Continued)

FOREIGN PATENT DOCUMENTS

CN 106080590 A 11/2016
CN 106080606 A 11/2016
(Continued)

OTHER PUBLICATIONS

International Search Report in International Patent Application No. PCT/CN2019/126268 dated Mar. 19, 2020.
(Continued)

*Primary Examiner* — James J Lee
*Assistant Examiner* — Andrew Sang Kim
(74) *Attorney, Agent, or Firm* — Dilworth IP, LLC (57) ABSTRACT

Embodiments of the present disclosure provide a method for processing vehicle driving mode switching, a vehicle and a server. The method includes: determining (S103) a target switching reason upon detecting that a driving mode of a vehicle is switched from unmanned driving to manned driving; acquiring (S104) status information and/or traveling environment information of the vehicle corresponding to the target switching reason; and sending the status information and/or the traveling environment information, and the target switching reason to a server, to enable the server to analyze the target switching reason, and improve the automatic driving system continuously according to the analysis result.

18 Claims, 5 Drawing Sheets

(51) Int. Cl.
*B60W 50/08* (2020.01)
*B60W 50/14* (2020.01)
*B60W 50/00* (2006.01)

(52) U.S. Cl.
CPC ........ *B60W 50/14* (2013.01); *B60W 60/0059* (2020.02); *B60W 2050/0072* (2013.01); *B60W 2050/146* (2013.01)

(56) References Cited

U.S. PATENT DOCUMENTS

| | | | |
|---|---|---|---|
| 2019/0011910 A1* | 1/2019 | Lockwood | G05D 1/0038 |
| 2019/0179305 A1* | 6/2019 | Magzimof | G05D 1/0088 |
| 2019/0384312 A1* | 12/2019 | Herbach | G05D 1/0038 |

FOREIGN PATENT DOCUMENTS

| | | |
|---|---|---|
| CN | 106094830 A | 11/2016 |
| CN | 106218639 A | 12/2016 |
| CN | 107123175 A | 9/2017 |
| CN | 109878511 A | 6/2019 |
| EP | 2940545 B1 | 8/2018 |

OTHER PUBLICATIONS

Second Office Action in CN Patent Application No. 201910035550.X dated Jul. 6, 2020.
First Office Action in CN Patent Application No. 201910035550.X dated Feb. 7, 2020.

* cited by examiner

METHOD FOR PROCESSING VEHICLE DRIVING MODE SWITCHING, VEHICLE AND SERVER

CROSS-REFERENCE TO RELATED APPLICATIONS

This application is a continuation application of the International application PCT/CN2019/126268, filed on Dec. 18, 2019, entitled "METHOD FOR PROCESSING VEHICLE DRIVING MODE SWITCHING, VEHICLE AND SERVER", which claims priority to Chinese Patent Application No. 201910035550.X, filed with the Chinese Intellectual Property Office on Jan. 15, 2019 and entitled "METHOD FOR PROCESSING VEHICLE DRIVING MODE SWITCHING, VEHICLE AND SERVER". The aforementioned patent applications are hereby incorporated by reference in their entireties.

TECHNICAL FIELD

Embodiments of the present disclosure relates to the field of vehicle technologies and, in particular, to a method for processing vehicle driving mode switching, a vehicle and a server.

BACKGROUND

With the development and continuous improvement of an unmanned driving vehicle (hereinafter an unmanned vehicle), the unmanned vehicle may be applied in the field of taxies. Compared with a manned driving vehicle, the operating cost of the unmanned vehicle shall be reduced effectively. However, with the application of the unmanned vehicle, the safety of the unmanned vehicle during traveling has become particularly important.

SUMMARY

The embodiments of the present disclosure provide a method for processing vehicle driving mode switching, a vehicle and a server.

In a first aspect, an embodiment of the present disclosure provides a method for processing vehicle driving mode switching, the method may include:
  determining a target switching reason upon detecting that a driving mode of a vehicle is switched from unmanned driving to manned driving;
  acquiring status information and/or traveling environment information of the vehicle corresponding to the target switching reason; and
  sending the status information and/or the traveling environment information, and the target switching reason to a server, to enable the server to analyze the target switching reason.

In a possible implementation, the method further includes:
  receiving a solving strategy sent by the server corresponding to the target switching reason.

In a possible implementation, where the determining the target switching reason upon detecting that the driving mode of the vehicle is switched from the unmanned driving to the manned driving includes:
  displaying at least one switching reason corresponding to the driving mode upon detecting that the driving mode of the vehicle is switched from the unmanned driving to the manned driving;
  receiving a selecting instruction, where the selecting instruction is configured to indicate a switching reason selected by a user; and
  determining the switching reason selected by the user as the target switching reason.

In a possible implementation, where before the determining the target switching reason upon detecting that the driving mode of the vehicle is switched from the unmanned driving to the manned driving, the method further includes:
  receiving a triggering instruction, where the triggering instruction is configured to indicate that the driving mode is switched from the unmanned driving to the manned driving; and
  switching the driving mode of the vehicle to the manned driving according to the triggering instruction.

In a possible implementation, the switching reason includes at least one of the following reasons: being unable to avoid an obstacle, being about to crash, needing to slow down, needing to speed up, needing to stop, being about to violate a traffic rule or deviating from a traveling lane.

In a possible implementation, where the status information of the vehicle includes at least one of the following information: status information of a brake pedal, status information of a gas pedal, status information of a steering wheel, speed information, traveling position information or traveling direction information.

In a possible implementation, the traveling environment information of the vehicle includes at least one of the following information: road information of a traveling road surface, information of an obstacle, position information of the vehicle, brightness of a traveling section, visibility information or information of a traffic signal on the travelling section.

In a possible implementation, where the acquiring the status information and/or the traveling environment information of the vehicle corresponding to the target switching reason includes:
  acquiring the status information and/or the traveling environment information of the vehicle corresponding to the target switching reason according to a pre-stored correspondence between a switching reason and, status information and/or traveling environment information of a vehicle.

In a second aspect, an embodiment of the present disclosure provides a method for processing vehicle driving mode switching, the method may include:
  receiving status information and/or traveling environment information of a vehicle, and a target switching reason sent by the vehicle, wherein the target switching reason is determined upon detecting that a driving mode of the vehicle is switched from unmanned driving to manned driving; and
  analyzing the target switching reason according to the status information and/or the traveling environment information, and the target switching reason.

In a possible implementation, where the analyzing the target switching reason according to the status information and/or the traveling environment information, and the target switching reason includes:
  determining, according to the target switching reason, target history status information and/or target history traveling environment information corresponding to the target switching reason from history status information and/or history traveling environment information; and
  training the status information and/or the traveling environment information, and the target history status information and/or the target history traveling environment information to obtain a solving strategy corresponding to the target switching reason.

In a possible implementation, after the training the status information and/or the traveling environment information, and the target history status information and/or the target history traveling environment information to obtain the solving strategy corresponding to the target switching reason, further including:

sending to the vehicle the solving strategy corresponding to the target switching reason.

In a third aspect, an embodiment of the present disclosure provides a vehicle, the vehicle may include:

a processing unit, configured to determine a target switching reason upon detecting that a driving mode of a vehicle is switched from unmanned driving to manned driving;

an acquiring unit, configured to acquire status information and/or traveling environment information of the vehicle corresponding to the target switching reason; and an analyzing unit, configured to send the status information and/or the driving the environment information, and the target switching reason to a server, to enable the server to analyze the target switching reason.

In a possible implementation, the vehicle may further include a receiving unit:

the receiving unit is configured to receive a solving strategy sent by the server corresponding to the target switching reason.

In a possible implementation, the processing unit is specifically configured to: display at least one switching reason corresponding to the driving mode upon detecting that the driving mode of the vehicle is switched from the unmanned driving to the manned driving; and receive a selecting instruction, where the selecting instruction is configured to indicate a switching reason selected by a user; and determine the switching reason selected by the user as the target switching reason.

In a possible implementation, the receiving unit is further configured to receive a triggering instruction, where the triggering instruction is configured to indicate that the driving mode is switched from the unmanned driving to the manned driving; and the processing unit is further configured to switch the driving mode of the vehicle to the manned driving according to the triggering instruction.

In a possible implementation, the switching reason includes at least one of the following reasons: being unable to avoid an obstacle, being about to crash, needing to slow down, needing to speed up, needing to stop, being about to violate a traffic rule or deviating from a traveling lane.

In a possible implementation, the status information of the vehicle includes at least one of the following information: status information of a brake pedal, status information of a gas pedal, status information of a steering wheel, speed information, traveling position information or traveling direction information.

In a possible implementation, the traveling environment information of the vehicle includes at least one of the following information: road information of a traveling road surface, information of an obstacle, position information of the vehicle, brightness of a traveling section, visibility information or information of a traffic signal on the travelling section.

In a possible implementation, the acquiring unit is specifically configured to acquire the status information and/or the traveling environment information of the vehicle corresponding to the target switching reason according to a pre-stored correspondence between a switching reason and, status information and/or traveling environment information of a vehicle.

In a fourth aspect, an embodiment of the present disclosure provides a server, the server may include:

a receiving unit, configured to receive status information and/or traveling environment information of a vehicle, and a target switching reason sent by the vehicle, where the target switching reason is determined upon detecting that a driving mode of the vehicle is switched from unmanned driving to manned driving; and an analyzing unit, configured to analyze the target switching reason according to the status information and/or the traveling environment information, and the target switching reason.

In a possible implementation, the analyzing unit is specifically configured to determine, according to the target switching reason, target history status information and/or target history traveling environment information corresponding to the target switching reason from history status information and/or history traveling environment information; and train the status information and/or the traveling environment information, and the target history status information and/or the target history traveling environment information to obtain a solving strategy corresponding to the target switching reason.

In a possible implementation, the server may include: a sending unit;

the sending unit is configured to send to the vehicle the solving strategy corresponding to the target switching reason.

In a fifth aspect, an embodiment of the present disclosure provides a vehicle, the vehicle may include: a processor and a memory, where the memory is configured to store program instructions;

the processor is configured to read the program instructions in the memory, and execute, according to the program instructions in the memory, the method for processing vehicle driving mode switching according to the first aspect or any one of the implementations of the first aspect mentioned above.

In a sixth aspect, an embodiment of the present disclosure provides a server, the server may include: a processor and a memory, where the memory is configured to store program instructions;

the processor is configured to read the program instructions in the memory, and execute, according to the program instructions in the memory, the method for processing vehicle driving mode switching according to the second aspect or any one of the implementations of the second aspect.

In a seventh aspect, an embodiment of the present disclosure provides a computer readable storage medium, the computer-readable storage medium stores a computer program, and when the computer program is executed by a processor, the method for processing vehicle driving mode switching according to the first aspect or any one of the implementations of the first aspect mentioned above is executed; or, when the computer program is executed by the processor, the method for processing vehicle driving mode switching according to the second aspect or any one of the implementations of the second aspect mentioned above is executed.

DESCRIPTION OF EMBODIMENTS

In order to make the purposes, the technical solutions and the advantages of the embodiments of the present disclosure more clearly, the following clearly and completely describes the technical solutions of the embodiments of the present disclosure with reference to the accompanying drawings of the embodiments of the present disclosure. Obviously, the described embodiments are simply part of embodiments of the present disclosure, rather than all of the embodiments. Based on the embodiments of the present disclosure, all other embodiments obtained by those of ordinary skill in the art without paying creative effort are within the protection scope of the present disclosure.

The terms "first", "second", "third", "fourth" and the like (if present) in the description, claims and the above drawings of the present disclosure are used to distinguish similar objects rather than to describe a specific sequence or order. It should be understood that the data used in this way may be interchanged in suitable situations, such that the embodiments of the present application described herein may be implemented in a sequence other than those illustrated or described herein. In addition, the terms "include" and "have" and any variations thereof are intended to cover a non-exclusive inclusion. For example, processes, methods, systems, products, or devices that include a series of steps or units are not necessarily limited to those steps or units clearly listed, but may include other steps or units that are not clearly listed or inherent to such processes, methods, products or devices.

In the prior art, during the traveling of the unmanned vehicle, an existing automatic driving system is adopted to control the traveling of the unmanned vehicle, if there is an obstacle ahead at this time, the existing automatic driving system may not handle the situation, such that the unmanned vehicle continues traveling and collides with the obstacle. As a result, the safety of the unmanned vehicle during travelling is not high. In order to improve the safety of the unmanned vehicle during travelling, the embodiments of the present disclosure provide a method for processing vehicle driving mode switching, a vehicle and a server. A target switching reason is determined at first upon detecting that a driving mode of a vehicle is switched from unmanned driving to manned driving, and status information and/or traveling environment information of the vehicle corresponding to the target switching reason is acquired; then the status information and/or the traveling environment information, and the target switching reason are sent to a server such that the server analyzes the target switching reason, and the automatic driving system is improved continuously according to the analysis result. In this way, when encountering the target switching reason next time, the improved automatic driving system may avoid dangers caused by the target switching reason, thereby improving the safety of the unmanned vehicle during travelling.

The technical solution of the present disclosure and how the technical solution of the present disclosure solves the above technical problem will be described in detail below with specific embodiments. The following specific embodiments may be combined with each other, and the same or similar concepts or processes will not be repeated in some embodiments. The embodiments of the present disclosure will be described below in conjunction with the accompanying drawings.

The embodiments of the present disclosure provide a method for processing vehicle driving mode switching, a vehicle and a server, so as to improve the safety of the unmanned vehicle during travelling.

Figure 1:
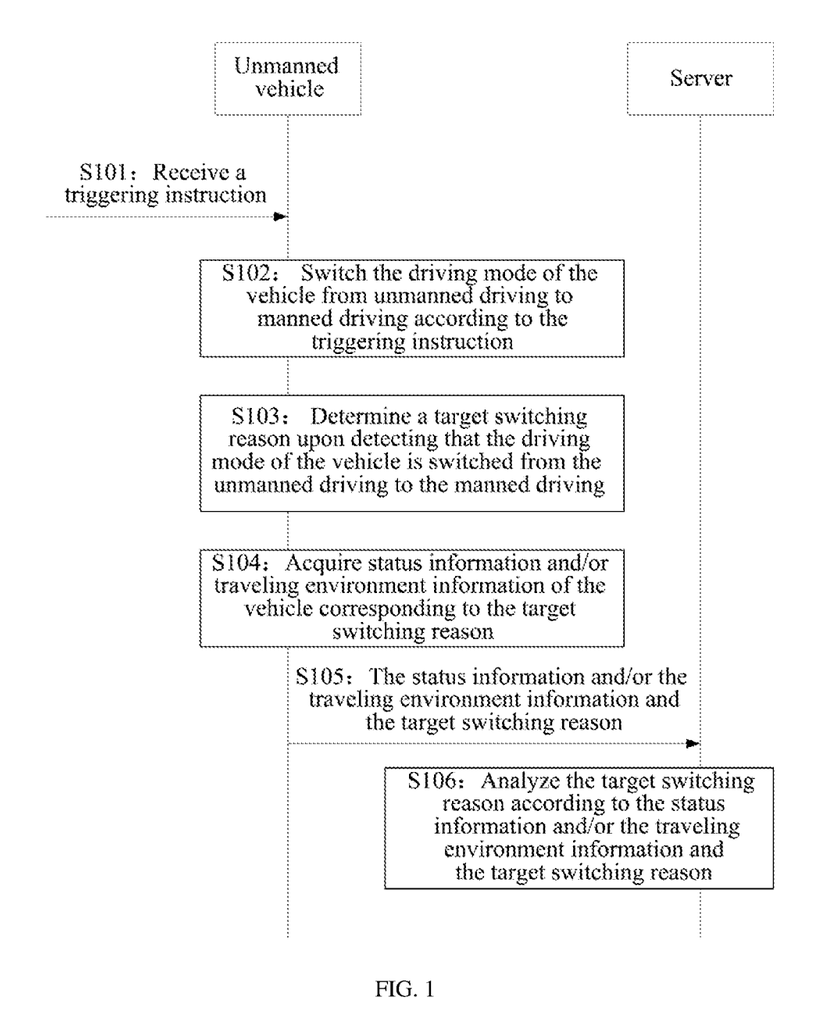
FIG. 1 is a schematic flowchart of a method for processing vehicle driving mode switching provided by an embodiment of the present disclosure.

FIG. 1 is a schematic flowchart of a method for processing vehicle driving mode switching provided by an embodiment of the present disclosure. As an example, please refer to FIG. 1, a processing method for the driving mode switching of the vehicle may include:

S101, the unmanned vehicle receives a triggering instruction.

Where the triggering instruction is configured to indicate that a driving mode is switched from unmanned driving to manned driving.

Illustratively, the triggering instruction may be sent by a safety supervisor on the unmanned vehicle, or certainly, it may also be sent by a user. Taking the safety supervisor as an example, when sending a triggering instruction, the safety supervisor may send the triggering instruction through a button on the unmanned vehicle, or send the triggering instruction through a virtual button on a screen of the unmanned vehicle, the triggering instruction may also be sent by a voice system of the unmanned vehicle of course, which may be specifically set based on actual needs. The embodiment of the present disclosure does not make further limitations herein on how to send the triggering instruction.

For the safety supervisor on the unmanned vehicle, when a driving behavior of the unmanned vehicle is determined to be dangerous, the triggering instruction may be sent through the button on the unmanned vehicle, so that the unmanned vehicle switches the current driving mode of the unmanned vehicle from the unmanned driving to the manned driving after receiving the triggering instruction, that is, executes following S102.

S102, the unmanned vehicle switches the driving mode of the vehicle from the unmanned driving to the manned driving according to the triggering instruction.

After receiving the triggering instruction, the unmanned vehicle may switch the driving mode of the vehicle from the unmanned driving to the manned driving automatically.

S103, the unmanned vehicle determines a target switching reason upon detecting that the driving mode of the vehicle is switched from the unmanned driving to the manned driving.

Optionally, the switching reason includes at least one of the following reasons: being unable to avoid an obstacle, being about to crash, needing to slow down, needing to speed up, needing to stop, being about to violate a traffic rule or deviating from a traveling lane. Certainly, the switching reason may also include other dangerous reasons. The embodiment of the present disclosure simply takes the switching reason which may include at least one of the foregoing reasons as an example for illustration, but it does not mean that the embodiments of the present disclosure are limited thereto. As an example, the wording "at least one" may refer to one or more, and may be specifically set according to actual needs. Herein, the value of the "at least one" is not further limited in the embodiment of the present disclosure.

It should be noted that, in an embodiment of the present disclosure, when the unmanned vehicle detects that the driving mode of the vehicle is switched from the unmanned driving to the manual driving, the target switching reason may be determined by at least two possible implementation methods as follows.

In a possible implementation, the unmanned vehicle may display at least one switching reason corresponding to the driving mode upon detecting that the driving mode of the vehicle is switched from the unmanned driving to the manned driving. Correspondingly, the safety supervisor selects a switching reason among the at least one switching reason corresponding to the driving mode, and sends a selecting instruction to the unmanned vehicle, so that the unmanned vehicle may determine the switching reason selected by the safety supervisor as the target switching reason according to the selecting instruction, thereby determining the target switching reason.

Optionally, in this possible implementation, when sending the selecting instruction, the safety supervisor may send the selecting instruction to the unmanned vehicle by voice, or send the selecting instruction to the unmanned vehicle by clicking the button on the screen. Certainly, the selecting instructions may also be sent to the unmanned vehicle through text. Herein, the embodiment of the present disclosure simply takes these three ways for sending the selecting instruction to the unmanned vehicle as an example for illustration, but it does not mean that the embodiments of the present disclosure are limited thereto.

Illustratively, in this possible implementation, during the travelling of the unmanned vehicle, when discovering that there is an unavoidable obstacle ahead of the unmanned vehicle, the safety supervisor may send a triggering instruction through a button on the unmanned vehicle, such that when the unmanned vehicle receives the triggering instruction, the unmanned vehicle switches the current driving mode of the unmanned vehicle from the unmanned driving to the manned driving. At this time, after detecting that the driving mode of the unmanned vehicle is switched from the unmanned driving to the manned driving, the unmanned vehicle may display the following switching reasons to the safety supervisor on the screen of the vehicle: being unable to avoid an obstacle, being about to crash, needing to slow down, needing to speed up, needing to stop, being about to violate a traffic rule or deviating from a traveling lane. The safety supervisor may input a selecting instruction to the vehicle by clicking the virtual button corresponding to "being unable to avoid an obstacle", so that the unmanned vehicle may determine the "being unable to avoid an obstacle" as the target switching reason according to the selecting instruction.

In another possible implementation, upon detecting that the driving mode of the unmanned vehicle is switched from the unmanned driving to the manned driving, the unmanned vehicle may not need to display at least one switching reason corresponding to the driving mode, instead, the safety supervisor may send an instruction including the target switching reason directly, such that the unmanned vehicle receives the target switching reason directly from the safety supervisor, thereby determining the target switching reason.

It should be noted that before the safety supervisor sends the instruction including the target switching reason, the target switching reason input by the safety supervisor should be normalized at first, so that the unmanned vehicle can recognize the target switching reason and further determine the target switching reason.

Optionally, in this possible implementation, when sending the instruction including the target switching reason, the safety supervisor may send the instruction including the target switching reason to the unmanned vehicle by voice, or send the instruction including the target switching reason to the unmanned vehicle by clicking a preset reason switching button on the screen. Certainly, the safety supervisor may also send the instruction including the target switching reason to the unmanned vehicle through text. Herein, the embodiments of the present disclosure simply take these three ways for sending the instruction including the target switching reason to the unmanned vehicle as an example for illustration, but it does not mean that the embodiments of the present disclosure are limited thereto.

For example, in this possible implementation, during the travelling of the unmanned vehicle, when discovering that there is an unavoidable obstacle ahead of the unmanned vehicle, the safety supervisor may send a triggering instruction through the button on the unmanned vehicle, such that when the unmanned vehicle receives the triggering instruction, the unmanned vehicle switches the current driving mode of the unmanned vehicle from the unmanned driving to the manned driving. At this time, after detecting that the driving mode of the unmanned vehicle is switched from the unmanned driving to the manned driving, the unmanned vehicle may not need to display the following switching reasons on the screen of the vehicle to the safety supervisor: being unable to avoid an obstacle, being about to crash, needing to slow down, needing to speed up, needing to stop, being about to violate a traffic rule or deviate from a traveling lane, instead, the safety supervisor may send the instruction including the "being unable to avoid an obstacle" directly, such that the unmanned vehicle receives the "being unable to avoid an obstacle" directly from the safety supervisor, thereby determining the "being unable to avoid an obstacle" as the target switching reason.

It should be understood that, in the embodiments of the present disclosure, the above two possible implementations are simply used as examples for illustrating the determination of the target switching reason by the unmanned vehicle, but it does not mean that the embodiments of the present disclosure are limited thereto.

S104, the unmanned vehicle acquires status information and/or traveling environment information of the vehicle corresponding to the target switching reason.

While acquiring information, only the status information of the vehicle corresponding to the target switching reason may be acquired, or only the traveling environment information corresponding to the target switching reason may be acquired. Certainly, the status information and traveling environment information of the vehicle corresponding to the target switching reason may also be acquired simultaneously. It should be noted that, in the embodiments of the present disclosure, the more types of information acquired are in a positive correlation with the higher accuracy of an analysis result obtained by analyzing the target switching reason according to the information by the server. That is, the more types of information are acquired, the more accurate the analysis result obtained by analyzing the target switching reason according to the information by the server would be.

Optionally, the status information of the vehicle includes at least one of the following information: status information of a brake pedal, status information of a gas pedal, status information of a steering wheel, speed information, traveling position information or traveling direction information. Certainly, other status information of the vehicle may also be included. Herein, the embodiments of the present disclosure only take the status information of the vehicle including at least one of these types as an example, but it does not mean that the embodiments of the present disclosure are limited thereto.

Optionally, the traveling environment information of the vehicle includes at least one of the following information: road information of a traveling road surface, information of an obstacle, position information of the vehicle, brightness of a traveling section, visibility information or information of a traffic signal on the travelling section. Certainly, other traveling environment information may also be included. Herein, the embodiments of the present disclosure only take the traveling environment information including at least one of these types as an example, but it does not mean that the embodiments of the present disclosure are limited thereto.

Optionally, in an embodiment of the present disclosure, before acquiring the status information and/or the traveling environment information of the vehicle corresponding to the target switching reason, a correspondence between a switching reason and, status information and/or traveling environment information of the vehicle may be established and stored in advance. In this way, after determining the target switching reason, according to the pre-stored correspondence between the switching reason and, the status information and/or the traveling environment information of the vehicle, the status information and/or the traveling environment information of the vehicle corresponding to the target switching reason may be determined from the status information and/or the traveling environment information of the vehicle, so as to acquire the status information and/or the traveling environment information of the vehicle corresponding to the target switching reason.

It should be noted that, in the embodiments of the present disclosure, there is no need to establish a correspondence between the switching reason and, the status information and/or the traveling environment information of the vehicle each time before acquiring status information and/or traveling environment information of the vehicle corresponding to a target switching reason, instead, the correspondence between the switching reason and, the status information and/or the traveling environment information of the vehicle needs to be established and stored before acquiring status information and/or traveling environment information of the vehicle corresponding to a target switching reason for the first time. In case of a new switching reason, and its corresponding status information and/or the traveling environment information of the vehicle, the pre-established correspondence may be updated, and the updated correspondence between the switching reason and, the status information and/or the traveling environment information may be stored.

For example, when the target switching reason is "being unable to avoid an obstacle", the status information and/or the traveling environment information of the vehicle corresponding to the "being unable to avoid an obstacle" may be acquired. At this time, the status information of the vehicle may include a traveling speed A of the vehicle, traveling position information is: a distance to the obstacle is B meters, traveling direction information is: a direction toward the obstacle, etc.; the traveling environment information may include road information of a traveling road surface or information of the obstacle: a big rock, position information of the vehicle: a distance to the obstacle is B meters, etc. The status information and the traveling environment information of the vehicle corresponding to the "being unable to avoid an obstacle" listed herein are only examples, which should not be construed as limitations on the embodiments of the present disclosure.

After acquiring the status information and/or the traveling environment information of the vehicle corresponding to the target switching reason through S104, the following S105 may be executed.

S105, the unmanned vehicle sends the status information and/or the traveling environment information, and the target switching reason to a server.

Illustratively, the unmanned vehicle may send the status information and/or the traveling environment information, and the target switching reason to the server through a wireless network. Certainly, the status information and/or the traveling environment information and the target switching reason may be sent to the server in other ways. Herein, the embodiments of the present disclosure only take it as an example where the unmanned vehicle sends the status information and/or the traveling environment information and the target switching reason to the server through the wireless network for illustration, but it does not mean that the embodiments of the present disclosure are limited thereto.

In an embodiment of the present disclosure, the unmanned vehicle sends the status information and/or the traveling environment information, and the target switching reason to the server, such that the server receives the status information and/or the traveling environment information and the target switching reason, and executes the following S106.

S106, the server analyzes the target switching reason according to the status information and/or the traveling environment information and the target switching reason.

After receiving the status information and/or the traveling environment information and the target switching reason, the server may analyze the target switching reason according to the status information and/or the traveling environment information and the target switching reason, and improve the automatic driving system continuously according to the analysis result. In this way, when encountering the target switching reason next time, the improved automatic driving system may avoid the danger caused by the target switching reason, thereby improving the safety of the unmanned vehicle during travelling.

Illustratively, after acquiring the status information and/or the traveling environment information of the vehicle corresponding to a target switching reason "being unable to avoid an obstacle", the unmanned vehicle may send the status information and/or the traveling environment information of the vehicle corresponding to the "being unable to avoid an obstacle" to the server, such that after receiving the status information and/or the traveling environment information of the vehicle corresponding to the "being unable to avoid an obstacle", the server may analyze the target switching reason "being unable to avoid an obstacle", and improve the automatic driving system continuously according to the analysis result. In this way, when encountering the target switching reason next time, the improved automatic driving system may avoid the danger caused by the target switching reason, thereby improving the safety of the unmanned vehicle during travelling.

The embodiments of the present disclosure provide a method for processing vehicle driving mode switching. A target switching reason is determined at first upon detecting that a driving mode of a vehicle is switched from unmanned driving to manned driving, and status information and/or traveling environment information of the vehicle corresponding to the target switching reason is acquired; then the status information and/or the traveling environment information, and the target switching reason are sent to a server such that the server analyzes the target switching reason, and the automatic driving system is improved continuously according to the analysis result. In this way, when encountering the target switching reason next time, the improved automatic driving system may avoid dangers caused by the target switching reason, thereby improving the safety of the unmanned vehicle during travelling.

Figure 2:
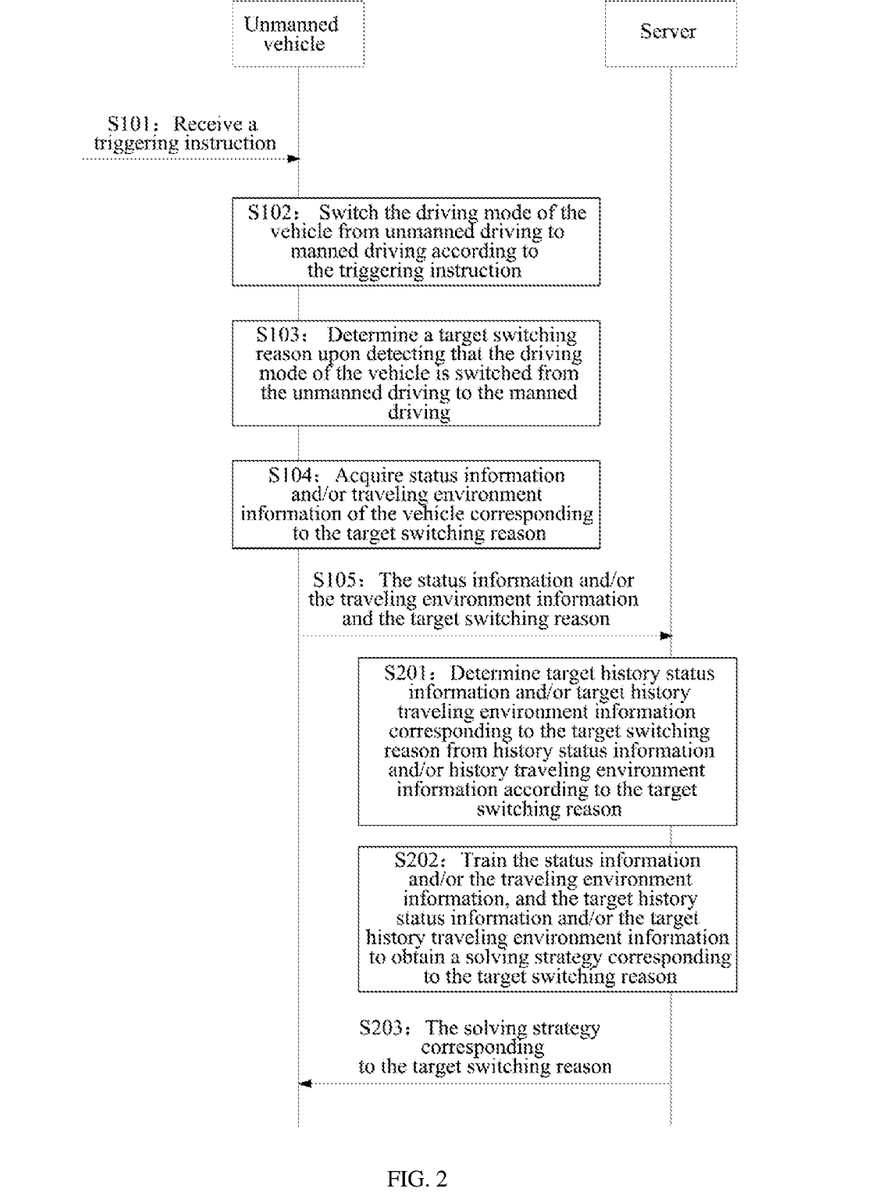
FIG. 2 is a schematic flowchart of another method for processing vehicle driving mode switching provided by an embodiment of the present disclosure.

Based on the above embodiments shown in FIG. 1, in order to describe in the embodiments of the present disclosure how the server performs S106 to analyze the target switching reason according to the status information and/or the traveling environment information and the target switching reason more clearly, illustratively, please refer to FIG. 2; FIG. 2 is a schematic flowchart of another method for processing vehicle driving mode switching provided by an embodiment of the present disclosure. The method for processing driving mode switching of a vehicle may also include:

S201, the server determines target history status information and/or target history traveling environment information corresponding to the target switching reason from history status information and/or history traveling environment information according to the target switching reason.

After receiving the target switching reason, the server searches, according to the target switching reason, the target history status information and/or the target history traveling environment information corresponding to the target switching reason in the history status information and/or history traveling environment information received previously. And after acquiring the target history status information and/or the target history traveling environment information, the server trains the status information and/or the traveling environment information, and the target history status information and/or the target history traveling environment information to obtain a solving strategy corresponding to the target switching reason.

Illustratively, when analyzes the target switching reason "being unable to avoid an obstacle" according to the target switching reason "being unable to avoid an obstacle", and the corresponding status information and/or the traveling environment information of the vehicle, a server may search the target history status information and/or the target history traveling environment information corresponding to the target switching reason "being unable to avoid an obstacle" in the previously received history status information and/or history traveling environment information; and then execute the following S202:

S202, the server trains the status information and/or the traveling environment information, and the target history status information and/or the target history traveling environment information to obtain a solving strategy corresponding to the target switching reason.

Optionally, the solving strategy may be stopping the vehicle immediately, or may be bypassing the obstacle. It may also be other strategies, and can be set based on actual needs. Herein, the embodiments of the present disclosure do not specifically limit what the solution strategy may include. Illustratively, the solving strategy corresponding to the target switching reason "being unable to avoid an obstacle" may be stopping the vehicle immediately or bypassing the obstacle.

After acquiring the target history status information and/or the target history traveling environment information corresponding to the target switching reason, the server may train the status information and/or the traveling environment information, and the target history status information and/or the target history traveling environment information to obtain the solving strategy corresponding to the target switching reason. In this way, the server may improve the automatic driving system continuously according to the solving strategy. In this way, when encountering the target switching reason next time, the improved automatic driving system may avoid the danger caused by the target switching reason, thereby improving the safety of the unmanned vehicle during travelling.

Optionally, as for the server, after obtaining the solving strategy corresponding to the target switching reason, the server may further execute the following S203:

S203, the server sends to the vehicle the solving strategy corresponding to the target switching reason, such that the vehicle receives the solving strategy corresponding to the target switching reason sent by the server. In this way, when encountering the target switching reason next time, the improved automatic driving system may avoid the danger caused by the target switching reason, thereby improving the safety of the unmanned vehicle during travelling.

In a possible scenario, when a safety supervisor finds there is danger for a driving behavior of the unmanned vehicle, the safety supervisor may send a triggering instruction to the unmanned vehicle, such that after the unmanned vehicle receives the triggering instruction, the unmanned vehicle switches the automatic driving mode of the vehicle to manned driving and displays at least one switching reason corresponding to the driving mode to the safety supervisor; correspondingly, the safety supervisor selects a switching reason among the at least one switching reason, and sends a selecting instruction configured to indicate the switching reason, such that the unmanned vehicle determines the switching reason selected by the safety supervisor as the target switching reason according to the selecting instruction; and further acquires status information and/or traveling environment information of the vehicle corresponding to the target switching reason, and sends the status information and/or the traveling environment information to the server, such that after receiving the history status information and/or the history traveling environment information and the target switching reason, the server searches target history status information and/or target history traveling environment information corresponding to the target switching reason in the previously received history status information and/or history traveling environment information, and trains the status information and/or the traveling environment information, and the target history status information and/or the target history traveling environment information to obtain a solving strategy corresponding to the target switching reason; further, after obtaining the solving strategy corresponding to the target switching reason, the server sends to the vehicle the solving strategy corresponding to the target switching reason, such that the vehicle receives the solving strategy corresponding to the target switching reason sent by the server. In this way, when encountering the target switching reason next time, the improved automatic driving system may avoid the danger caused by the target switching reason, thereby improving the safety of the unmanned vehicle during travelling.

Figure 3:
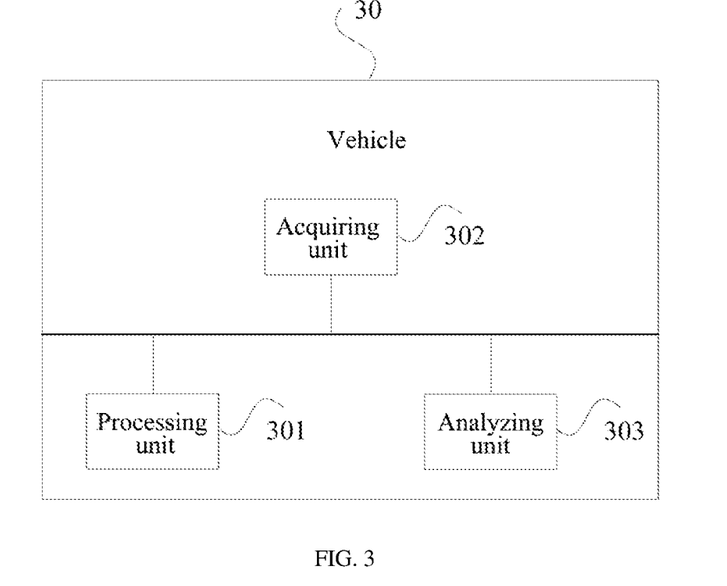
FIG. 3 is a structural diagram of a vehicle provided by an embodiment of the present disclosure.

FIG. 3 is a structural diagram of a vehicle 30 provided by an embodiment of the present disclosure. Illustratively, please refer to FIG. 3, the vehicle 30 may include:
- a processing unit 301, configured to determine a target switching reason upon detecting that a driving mode of a vehicle is switched from unmanned driving to manned driving;
- an acquiring unit 302, configured to acquire status information and/or traveling environment information of the vehicle corresponding to the target switching reason; and
- an analyzing unit 303, configured to send the status information and/or the traveling environment information, and the target switching reason to a server, to enable the server to analyze the target switching reason.

Figure 4:
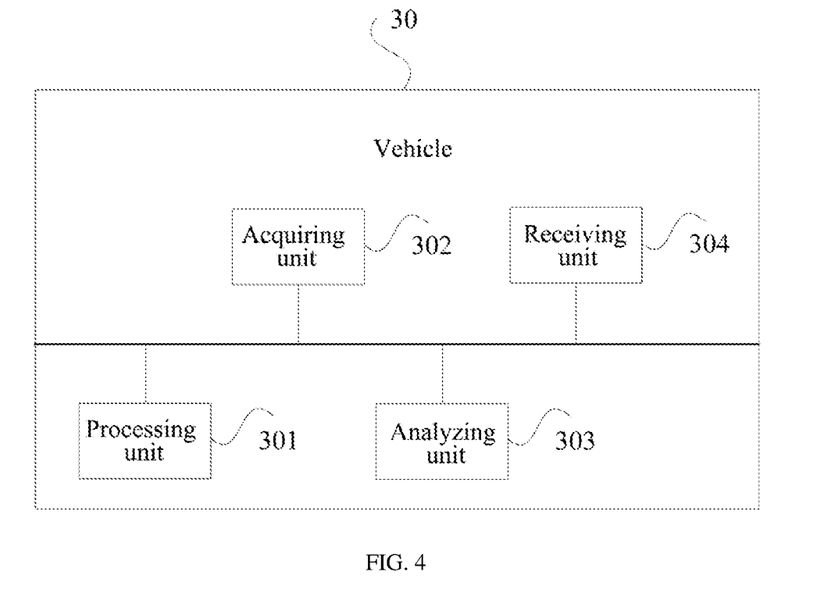
FIG. 4 is a structural diagram of another vehicle provided by an embodiment of the present disclosure.

Optionally, the vehicle 30 may further include a receiving unit 304. For example, please refer to FIG. 4, FIG. 4 is a structural diagram of another vehicle 30 provided by an embodiment of the present disclosure.

The receiving unit 304, configured to receive a solving strategy sent by the server corresponding to the target switching reason.

Optionally, the processing unit 301 is specifically configured to: display at least one switching reason corresponding to the driving mode upon detecting that the driving mode of the vehicle is switched from the unmanned driving to the manned driving; and receive a selecting instruction, where the selecting instruction is configured to indicate a switching reason selected by a user; and determine the switching reason selected by the user as the target switching reason.

Optionally, the receiving unit 304 is further configured to receive a triggering instruction, where the triggering instruction is configured to indicate that the driving mode is switched from the unmanned driving to the manned driving; and
- the processing unit 301 is further configured to switch the driving mode of the vehicle to the manned driving according to the triggering instruction.

Optionally, the switching reason includes at least one of the following reasons: being unable to avoid an obstacle, being about to crash, needing to slow down, needing to speed up, needing to stop, being about to violate a traffic rule or deviating from a traveling lane.

Optionally, the status information of the vehicle 30 includes at least one of the following information: status information of a brake pedal, status information of a gas pedal, status information of a steering wheel, speed information, traveling position information or traveling direction information.

Optionally, the traveling environment information of the vehicle includes at least one of the following information: road information of a traveling road surface, information of an obstacle, position information of the vehicle, brightness of a traveling section, visibility information or information of a traffic signal on the travelling section.

Optionally, the acquiring unit 302 is specifically configured to acquire the status information and/or the traveling environment information of the vehicle corresponding to the target switching reason according to a pre-stored correspondence between a switching reason and, status information and/or traveling environment information of a vehicle.

The vehicle 30 shown in the embodiments of the present disclosure may execute the technical solution of the method for processing driving mode switching on the unmanned vehicle side shown in any of the above embodiments, and its implementation principle and beneficial effects are similar to the implementation principle and beneficial effects of the method for processing driving mode switching, which will not be repeated herein again.

Figure 5:
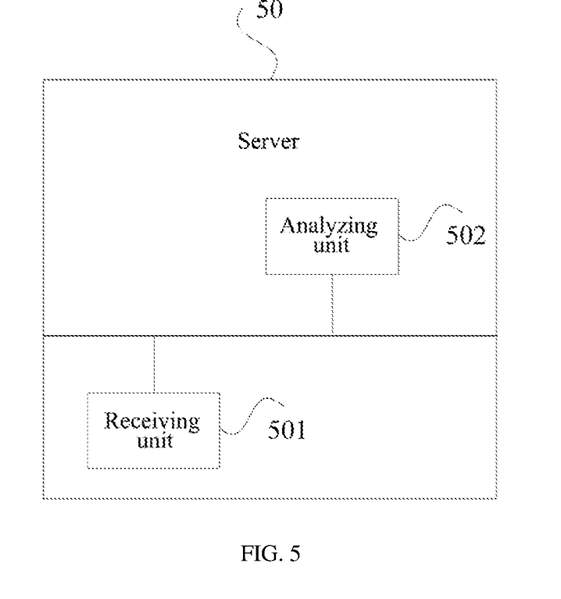
FIG. 5 is a structural diagram of a server provided by an embodiment of the present disclosure.

FIG. 5 is a structural diagram of a server 50 provided by an embodiment of the present disclosure. For example, please refer to FIG. 5, the server 50 may include:
- a receiving unit 501, configured to receive status information and/or traveling environment information of a vehicle, and a target switching reason sent by the vehicle, where the target switching reason is determined upon detecting that a driving mode of the vehicle is switched from unmanned driving to manned driving; and
- an analyzing unit 502, configured to analyze the target switching reason according to the status information and/or the traveling environment information, and the target switching reason.

Optionally, the analyzing unit 502 is specifically configured to determine, according to the target switching reason, target history status information and/or target history traveling environment information corresponding to the target switching reason from history status information and/or history traveling environment information; and train the status information and/or the traveling environment information, and the target history status information and/or the target history traveling environment information to obtain a solving strategy corresponding to the target switching reason.

Optionally, the server 50 may further include a sending unit 503. Illustratively, please refer to FIG. 6, which is a structural diagram of another server 50 provided by an embodiment of the present disclosure.

Figure 6:
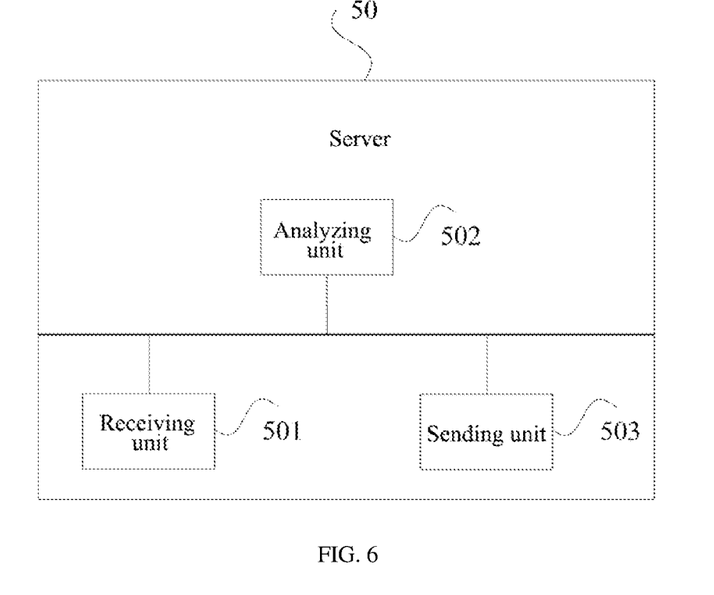
FIG. 6 is a structural diagram of another server provided by an embodiment of the present disclosure.

The sending unit 503 is configured to send to the vehicle the solving strategy corresponding to the target switching reason.

The server 50 shown in the embodiments of the present disclosure may execute the technical solution of the method for processing driving mode switching on the unmanned vehicle side shown in any one of the above embodiments, and its implementation principle and beneficial effects are similar to the implementation principle and beneficial effects of the method for processing driving mode switching, which will not be repeated herein again.

Figure 7:
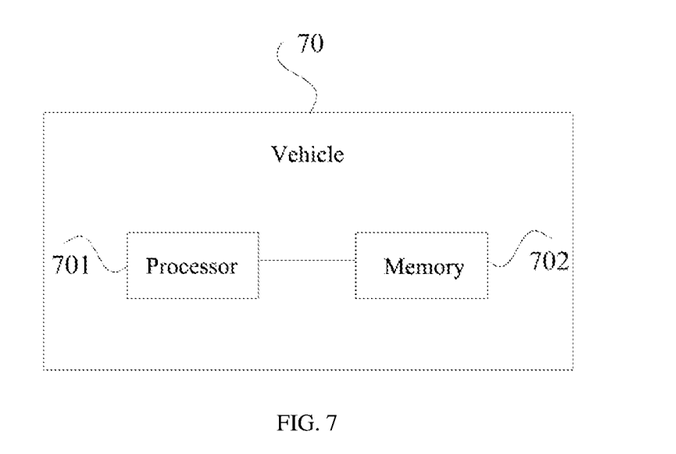
FIG. 7 is a structural diagram of yet another vehicle provided by an embodiment of the present disclosure.

FIG. 7 is a structural diagram of yet another vehicle 70 provided by an embodiment of the present disclosure. Illustratively, please refer to FIG. 7, the vehicle 70 may include a processor 701 and a memory 702, where
- the memory 702 is configured to store program instructions;
- the processor 701 is configured to read the program instructions in the memory 702, and execute, according to the program instructions in the memory 702, the method for processing vehicle driving mode switching on the unmanned vehicle side.

The vehicle 70 shown in the embodiments of the present disclosure may execute the technical solution of the method for processing driving mode switching on the unmanned vehicle side shown in any one of the above embodiments, and its implementation principle and beneficial effects are similar to the implementation principle and beneficial effects of the method for processing driving mode switching, which will not be repeated herein again.

Figure 8:
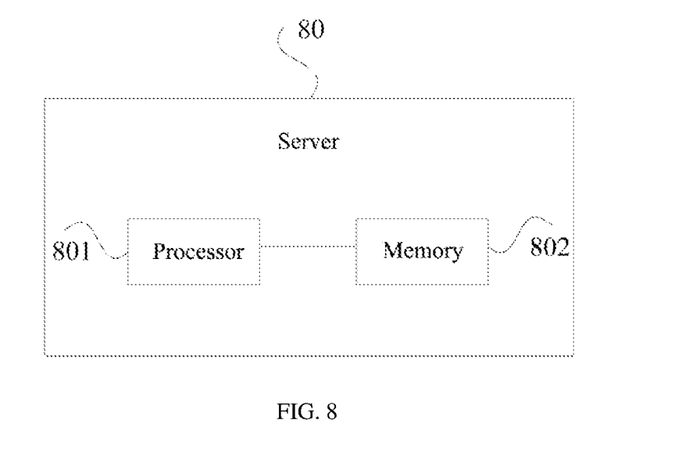
FIG. 8 is a structural diagram of yet another server provided by an embodiment of the present disclosure.

FIG. 8 is a structural diagram of yet another server 80 provided by an embodiment of the present disclosure. For example, please refer to FIG. 8, the server 80 may include a processor 801 and a memory 802, where the memory 802 is configured to store program instructions;

the processor 801 is configured to read program instructions in the memory 802, and execute, according to the program instructions in the memory 802, the method for processing vehicle driving mode switching on the unmanned vehicle side.

The server 80 shown in the embodiments of the present disclosure may execute the technical solution of the method for processing driving mode switching on the server side shown in any one of the above embodiments, and its implementation principle and beneficial effects are similar to the implementation principle and beneficial effects of the method for processing vehicle driving mode switching on the server side, which will not be repeated herein again.

An embodiment of the present disclosure also provides a computer readable storage medium. A computer program is stored on the computer-readable storage medium, when the computer program is executed by a processor, the technical solution of the method for processing driving mode switching shown in any one of the above embodiments on the unmanned vehicle side is executed, and its implementation principle and beneficial effects are similar to the implementation principle and beneficial effects of method for processing vehicle driving mode switching on the unmanned vehicle side, which will not be repeated herein again; or, when the computer program is executed by the processor, the method for processing vehicle driving mode switching on the server side is executed, and its implementation principle and beneficial effects are similar to the implementation principle and beneficial effects of method for processing vehicle driving mode switching on the server side, which will not be repeated herein again.

The processor in the above embodiments may be a general-purpose processor, a digital signal processor (DSP), an application specific integrated circuit (ASIC), a field programmable gate array (FPGA) or other programmable logic device, a discrete gate or a transistor logic device or discrete hardware components that may be configured to realize or execute any of the methods, steps and logic diagrams disclosed by the embodiments of the present disclosure. The general-purpose processor may be a microprocessor, or the processor may be any other regular processors, etc. The steps of the method disclosed in the embodiments of the present disclosure may be directly embodied as being executed and completed by a hardware decoding processor, or executed and realized by a combination of hardware and software modules in the decoding processor. The software modules may be located in a mature storage medium in the art, such as a random access memory (RAM), a flash memory, a read-only memory (ROM), a programmable read-only memory, an electrically erasable programmable read-only memory, a register and the like. The storage medium is located in a memory, and a processor reads instructions in the memory and completes the steps of the above method in combination with its hardware.

In several embodiments provided by the present disclosure, it should be understood that the disclosed device and method may be implemented in other ways. For example, the device embodiments described above are merely illustrative. For example, the division of the units is only a logical function division, and there may be other division methods in actual implementation. For example, a plurality of units or components may be combined or integrated into another system, or some features may be omitted or not implemented. In addition, the displayed or discussed mutual coupling or direct coupling or communication connection may be indirect coupling or a communication connection through some interfaces, devices or units, and may be in electrical, mechanical or other forms.

The units described as separate components may or may not be physically separate, and the components displayed as units may or may not be physical units, that is, they may be located in one place, or they may be distributed on a plurality of network units. Some or all of the units may be selected according to actual needs to achieve the objectives of the solutions of the embodiments. In addition, the functional units in the various embodiments of the present disclosure may be integrated into one processing unit, or each unit may exist alone physically, or two or more units may be integrated into one unit. The above-mentioned integrated unit may be realized in the form of hardware or hardware plus software functional units.

After considering the specification and practicing the present disclosure disclosed herein, those of ordinary skill in the art will easily think of other embodiments of the present disclosure. The present disclosure aims to cover any variations, applications, or adaptive changes of the present disclosure. These variations, applications, or adaptive changes follow the general principles of the present disclosure and include common sense or conventional technical means in the technical field not disclosed in the present disclosure. The description and the embodiments are only considered as exemplary, and the true scope and spirit of the present disclosure are indicated by the following claims.

It should be understood that the present disclosure is not limited to the precise structure that has been described above and shown in the drawings, and various modifications and changes may be made without departing from its scope. The scope of the present disclosure is simply limited by the attached claims.

What is claimed is:

1. A method for processing vehicle driving mode switching, wherein the method is implemented by a vehicle and comprises:

detecting that a driving mode of a vehicle is switched from unmanned driving to manned driving;

determining a target switching reason after the detecting;

acquiring at least one of status information and traveling environment information of the vehicle corresponding to the target switching reason through a sensor on the vehicle; and sending the at least one of the status information and the traveling environment information, and the target switching reason to a server, to enable the server to analyze the target switching reason and update an automatic driving system according to an analysis result;

wherein the determining the target switching reason after the detecting comprises;

displaying at least one switching reason corresponding to the driving mode after the detecting;

receiving a selecting instruction, wherein the selecting instruction is configured to indicate a switching reason selected by a user; and determining the switching reason selected by the user as the target switching reason.

2. The method according to claim 1, wherein the method further comprises:

receiving a solving strategy sent by the server corresponding to the target switching reason.

3. The method according to claim 1, wherein before the detecting that the driving mode of the vehicle is switched from the unmanned driving to the manned driving, the method further comprises:
receiving a triggering instruction, wherein the triggering instruction is configured to indicate that the driving mode is switched from the unmanned driving to the manned driving; and
switching the driving mode of the vehicle to the manned driving according to the triggering instruction.

4. The method according to claim 1, wherein the switching reason comprises at least one of the following reasons:
being unable to avoid an obstacle, being about to crash, needing to slow down, needing to speed up, needing to stop, being about to violate a traffic rule or deviating from a traveling lane.

5. The method according to claim 1, wherein the status information of the vehicle comprises at least one of the following information:
status information of a brake pedal, status information of a gas pedal, status information of a steering wheel, speed information, traveling position information or traveling direction information.

6. The method according to claim 1, wherein the traveling environment information of the vehicle comprises at least one of the following information:
road information of a traveling road surface, information of an obstacle, position information of the vehicle, brightness of a traveling section, visibility information or information of a traffic signal on the travelling section.

7. The method according to claim 1, wherein the acquiring the at least one of the status information and the traveling environment information of the vehicle corresponding to the target switching reason comprises:
acquiring the at least one of the status information and the traveling environment information of the vehicle corresponding to the target switching reason according to a pre-stored correspondence between a switching reason and, at least one of status information and traveling environment information of a vehicle.

8. A method for processing vehicle driving mode switching, wherein the method is implemented by a server and comprises:
receiving at least one of status information and traveling environment information of a vehicle, and a target switching reason sent by the vehicle, wherein the target switching reason is determined upon detecting that a driving mode of the vehicle is switched from unmanned driving to manned driving, wherein the at least one of status information and traveling environment information is acquired through a sensor on the vehicle; and
analyzing the target switching reason according to the at least one of the status information and the traveling environment information, and the target switching reason; and
updating an automatic driving system according to an analysis result;
wherein the target switching reason is determined by the vehicle through displaying at least one switching reason corresponding to the driving mode after the detecting, receiving a selecting instruction, wherein the selecting instruction is configured to indicate a switching reason selected by a user, and determining the switching reason selected by the user as the target switching reason.

9. The method according to claim 8, wherein the analyzing the target switching reason according to the at least one of the status information and the traveling environment information, and the target switching reason comprises:
determining, according to the target switching reason, at least one of target history status information and target history traveling environment information corresponding to the target switching reason from at least one of history status information and history traveling environment information; and
training based on the at least one of the status information and the traveling environment information, and the at least one of the target history status information and the target history traveling environment information to obtain a solving strategy corresponding to the target switching reason.

10. The method according to claim 9, wherein after the training based on the at least one of the status information and the traveling environment information, and the at least one of the target history status information and the target history traveling environment information to obtain the solving strategy corresponding to the target switching reason, further comprising:
sending to the vehicle the solving strategy corresponding to the target switching reason.

11. A vehicle, comprising a processor and a memory, wherein,
the memory is configured to store program instructions; and
the processor is configured to read the program instructions in the memory, and execute, according to the program instructions in the memory, steps of:
detecting that a driving mode of a vehicle is switched from unmanned driving to manned driving;
determining a target switching reason after the detecting;
acquiring at least one of status information and traveling environment information of the vehicle corresponding to the target switching reason through a sensor on the vehicle; and
sending the at least one of the status information and the traveling environment information, and the target switching reason to a server, to enable the server to analyze the target switching reason and update an automatic driving system according to an analysis result;
wherein the processor is further configured to execute, according to the program instructions in the memory, steps of:
displaying at least one switching reason corresponding to the driving mode after the detecting;
receiving a selecting instruction, wherein the selecting instruction is configured to indicate a switching reason selected by a user; and
determining the switching reason selected by the user as the target switching reason.

12. The vehicle according to claim 11, wherein the processor is further configured to:
receive a solving strategy sent by the server corresponding to the target switching reason.

13. The vehicle according to claim 11, wherein the processor is further configured to:
receive a triggering instruction, wherein the triggering instruction is configured to indicate that the driving mode is switched from the unmanned driving to the manned driving; and
switch the driving mode of the vehicle to the manned driving according to the triggering instruction.

14. The vehicle according to claim 11, wherein the switching reason comprises at least one of the following reasons:
   being unable to avoid an obstacle, being about to crash, needing to slow down, needing to speed up, needing to stop, being about to violate a traffic rule or deviating from a traveling lane.

15. The vehicle according to claim 11, wherein the status information of the vehicle comprises at least one of the following information:
   status information of a brake pedal, status information of a gas pedal, status information of a steering wheel, speed information, traveling position information or traveling direction information.

16. The vehicle according to claim 11, wherein the processor is configured to:
   acquire the at least one of the status information and the traveling environment information of the vehicle corresponding to the target switching reason according to a pre-stored correspondence between a switching reason and, at least one of status information and traveling environment information of a vehicle.

17. A non-transitory computer-readable storage medium, wherein,
   the non-transitory computer-readable storage medium stores a computer program, when the computer program is executed by a processor, the method for processing vehicle driving mode switching according to claim 1 is executed.

18. A non-transitory computer-readable storage medium, wherein,
   the non-transitory computer-readable storage medium stores a computer program, when the computer program is executed by a processor, the method for processing vehicle driving mode switching according to claim 8 is executed.

* * * * *